(12) United States Patent
Ganireddy et al.

(10) Patent No.: US 11,493,026 B2
(45) Date of Patent: Nov. 8, 2022

(54) WIND TURBINE ELECTRICAL SYSTEM HAVING REDISTRIBUTED COMPONENTS REDUCING THE OVERALL FOOTPRINT OF THE ELECTRICAL SYSTEM

(71) Applicant: General Electric Company, Schenectady, NY (US)

(72) Inventors: Govardhan Ganireddy, Salem, VA (US); Steven Wade Sutherland, Roanoke, VA (US); Rajni Kant Burra, Scottsdale, AZ (US); Andrej Petricko, Mississauga (CA); Dale Robert Mashtare, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/880,450

(22) Filed: May 21, 2020

(65) Prior Publication Data

US 2021/0363971 A1 Nov. 25, 2021

(51) Int. Cl.
| | |
|---|---|
| *F03D 80/80* | (2016.01) |
| *F03D 9/25* | (2016.01) |
| *H02K 7/18* | (2006.01) |
| *H02P 9/00* | (2006.01) |
| H02P 101/15 | (2016.01) |

(52) U.S. Cl.
CPC ............. *F03D 9/25* (2016.05); *H02K 7/183* (2013.01); *H02K 7/1838* (2013.01); *H02P 9/007* (2013.01); *F03D 80/82* (2016.05); *H02P 2101/15* (2015.01)

(58) Field of Classification Search
None
See application file for complete search history.

(56) References Cited

U.S. PATENT DOCUMENTS

| | | | |
|---|---|---|---|
| 3,299,303 A | * | 1/1967 | Newill .................. H02J 7/2437 310/66 |
| 4,400,659 A | | 8/1983 | Barron et al. |

(Continued)

FOREIGN PATENT DOCUMENTS

| | | |
|---|---|---|
| CN | 201332279 Y | 10/2009 |
| EP | 2405132 A1 | 1/2012 |

(Continued)

OTHER PUBLICATIONS

European Search Report for EP Application No. 21173488.4, dated Oct. 28, 2021.

*Primary Examiner* — Tulsidas C Patel
*Assistant Examiner* — S. Mikailoff
(74) *Attorney, Agent, or Firm* — Dority & Manning, P.A.

(57) ABSTRACT

An electrical system for a wind turbine having a reduced uptower footprint and method for achieving the same are provided. Accordingly, the electrical system includes a plurality of electrical subsystems having a plurality of electrical subsystem assemblies. At least one electrical subsystem assembly is integrated with the generator housing. Additionally, the electrical subsystem assembly is coupled between the stator or the rotor of the generator and the generator output connection. The electrical system incorporating the electrical subsystem assembly with the generator housing has a reduced uptower footprint relative to a nominal design of an electrical system.

7 Claims, 6 Drawing Sheets

(56) References Cited

U.S. PATENT DOCUMENTS

| | | | |
|---|---|---|---|
| 7,239,036 B2* | 7/2007 | D'Atre | F03D 7/0272 290/44 |
| 7,377,750 B1* | 5/2008 | Costin | F03D 80/30 416/146 R |
| 8,766,467 B2 | 7/2014 | Thomsen | |
| 9,018,783 B2 | 4/2015 | Cooper | |
| 2012/0049518 A1 | 3/2012 | Bodenstein et al. | |
| 2012/0133142 A1* | 5/2012 | Langel | F03D 13/20 290/55 |
| 2012/0217751 A1* | 8/2012 | Thomsen | F03D 9/25 290/55 |
| 2015/0108761 A1 | 4/2015 | Bala et al. | |

FOREIGN PATENT DOCUMENTS

| | | |
|---|---|---|
| KR | 101379246 B1 | 3/2014 |
| WO | WO2010/083903 A2 | 7/2010 |

\* cited by examiner

WIND TURBINE ELECTRICAL SYSTEM HAVING REDISTRIBUTED COMPONENTS REDUCING THE OVERALL FOOTPRINT OF THE ELECTRICAL SYSTEM

FIELD

The present disclosure relates in general to wind turbines, and more particularly to electrical systems for wind turbines having a reduced uptower footprint as compared to existing electrical systems.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy In modern wind turbines, the electrical energy is typically transmitted to an electrical grid via an electrical system. Various elements of the electrical system may be located within the nacelle. However, as the size and power-generating capability of wind turbines increases to meet growing demand, space within the nacelle is increasingly consumed by the drivetrain components. This, in turn, typically limits the amount of space available for the electrical system within the nacelle. As a result, a need exists to accommodate portions of the electrical system within the reduced amount of available free space within the nacelle.

Thus, the art is continuously seeking new and improved electrical systems having a reduced footprint. Accordingly, the present disclosure is directed to electrical systems having redistributed components within and around the wind turbine so as to minimize the amount of free space within the nacelle occupied by elements of the electrical system by reducing the overall footprint of the electrical system.

BRIEF DESCRIPTION

Aspects and advantages of the invention will be set forth in part in the following description, or may be obvious from the description, or may be learned through practice of the invention.

In one aspect, the present disclosure is directed to an electrical system for a wind turbine. The electrical system may include a generator housing located in a nacelle of the wind turbine. A generator may be disposed within the generator housing. The generator may include a stator and a rotor. The stator and/or the rotor may be operably coupled to at least one generator output connection. The electrical system may also include a plurality of electrical subsystems including a plurality of electrical subsystem assemblies. At least one electrical subsystem assembly may be integrated with the generator housing. The electrical subsystem assembly(s) may also be operably coupled between the stator and/or the rotor and the generator output connection(s). The plurality of electrical subsystems may include a stator switch subsystem, a power converter subsystem, and/or a generator step-up transformer.

In an embodiment, the electrical subsystem assembly(s) integrated with the generator housing may include a stator switch of the stator switch subsystem and/or a rotor-inductor assembly of the power converter subsystem.

In an additional embodiment, the stator switch may be operably coupled in-line between the generator output connection and the stator. The generator output connection may be coupled to the generator step-up transformer.

In a further embodiment, the electrical subsystem assembly(s) integrated with the generator housing may include the stator switch of the stator switch subsystem and the rotor-inductor assembly of the power converter subsystem.

In an embodiment, the generator housing may be coupled to a bedplate support frame of the wind turbine, with the bedplate support frame defining a recess between the generator housing and a surface of the bedplate support frame. In such embodiments, the electrical subsystem assembly(s) may be positioned at least partially within the recess.

In an additional embodiment, the nacelle may define a clearance between an inner surface of a wall of the nacelle and the generator housing. Accordingly, in such embodiments, the electrical subsystem assembly(s) may be positioned at least partially within the clearance.

In a further embodiment, the electrical subsystem assembly(s) may be electrically grounded by the generator housing.

In an embodiment, the stator switch subsystem may be absent of a stator grounding switch.

In another aspect, the present disclosure is directed to a method for reducing an uptower footprint of an electrical system of a wind turbine. The method may include disposing a generator within a nacelle of the wind turbine. The generator includes a stator and a rotor disposed within a generator housing. Further, the stator and/or the rotor may be operably coupled to at least one generator output connection. The method may also include positioning a power converter subsystem in a converter cabinet located within the nacelle. The power converter subsystem may be operably coupled to the generator. Further, the method may include integrating a stator switch of a stator switch subsystem with the generator housing. Additionally, the method may include operably coupling the stator switch to the stator or the rotor of the generator and the generator output connection(s). Moreover, the method may also include coupling the generator output connection(s) of the generator to a transformer.

In an embodiment, the method may further include retrofitting an existing electrical system of the wind turbine to reduce the overall footprint thereof. Wherein integrating the stator switch permits a reduction in the surface area of the electrical system and/or a number of electrical subsystem cabinets relative to an electrical system nominal design.

In an additional embodiment, integrating the stator switch may include electrically grounding the stator switch with the generator housing. Further, the integration may include eliminating a stator grounding switch of the stator switch subsystem.

In a further embodiment, the method may include integrating a rotor-inductor assembly of the power converter subsystem with the generator housing. The method may also include integrating a voltage feedback assembly of the power converter subsystem with a generator step-up transformer. Integrating the voltage feedback assembly and the rotor-inductor assembly may permit a reduction in the surface area of the converter cabinet.

In an embodiment, integrating the stator switch with the generator housing may permit at least one of a reduction in a gauge and a reduction in the number of electrical systems cables positioned within the nacelle.

In an additional embodiment, the wind turbine may include a bedplate support frame positioned within the nacelle. The generator housing may be coupled to the bedplate support frame, and the bedplate support frame may define a recess between generator housing and a surface of the bedplate support frame. The method may also include positioning the stator switch subsystem component and/or a power converter subsystem component at least partially within the recess.

In yet another aspect, the present disclosure is directed to a wind turbine. The wind turbine may include a tower, a nacelle mounted atop the tower, and a rotor mounted to the nacelle. The rotor may include a rotatable hub having a plurality of rotor blades secured thereto. The wind turbine may also include an electrical system disposed within the nacelle. The electrical system may include a generator located in a nacelle of the wind turbine. The generator includes a stator and a rotor housed within a generator housing. The stator and/or the rotor may be operably coupled to at least one generator output connection. The electrical system may also include a plurality of electrical subsystems including a plurality of electrical subsystem assemblies. The electrical subsystems may include a stator switch subsystem operably coupled to the generator. The electrical subsystems may also include a power converter subsystem positioned in a converter cabinet within the nacelle. The power converter subsystem may be operably coupled to the generator. Additionally, the electrical subsystems may include a generator step-of transformer positioned within the nacelle and operably coupled to the stator switch subsystem and the power converter subsystem. Further, the stator switch and/or the power converter subsystem assembly may be integrated with the generator housing and may be operably coupled between the stator or the rotor and the generator output connection. It should be understood that the wind turbine may further include any of the features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to an electrical system for a wind turbine having a reduced footprint uptower. In particular, the present disclosure includes an electrical system which may integrate one or more electrical subsystem assemblies with the generator housing. For example, a stator switch of the stator switch subsystem may be incorporated with the generator housing. By incorporating the stator switch with the generator housing, the number and/or size of electrical system cabinets located uptower may be reduced. In other words, by incorporating the stator switch with the generator housing, the stator switch may be incorporated into the space party occupied by the generator housing and thus a separate electrical system cabinet may not be required to house the stator switch. Additionally, integrating the electrical subsystem assembly with the generator housing may preclude the need for various components of the electrical system. For example, by incorporating the stator switch with the generator housing, the stator grounding switch of the stator switch subsystem may be eliminated.

Figure 1:
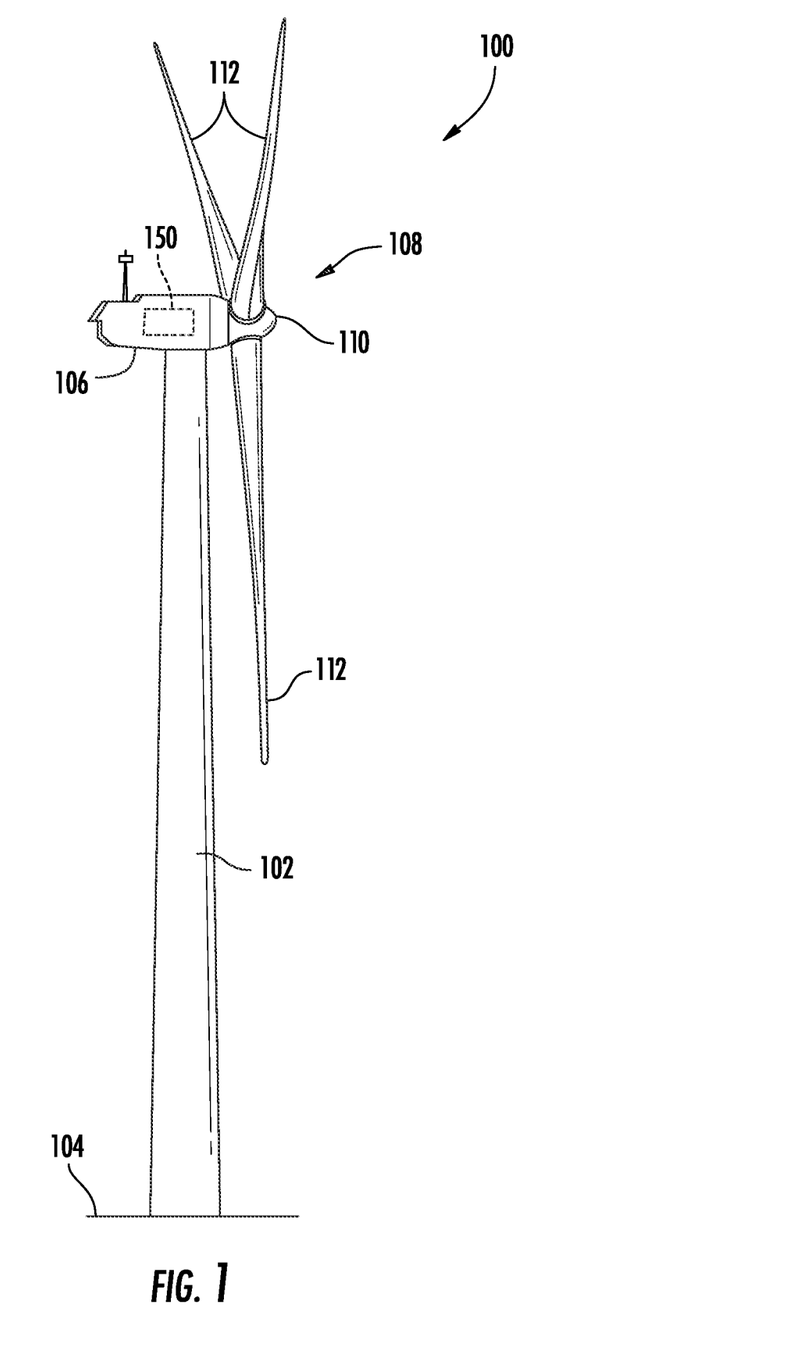
FIG. 1 illustrates a perspective view of one embodiment of a wind turbine according to the present disclosure.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 150 positioned within the nacelle 106 to permit electrical energy to be produced.

Figure 2:
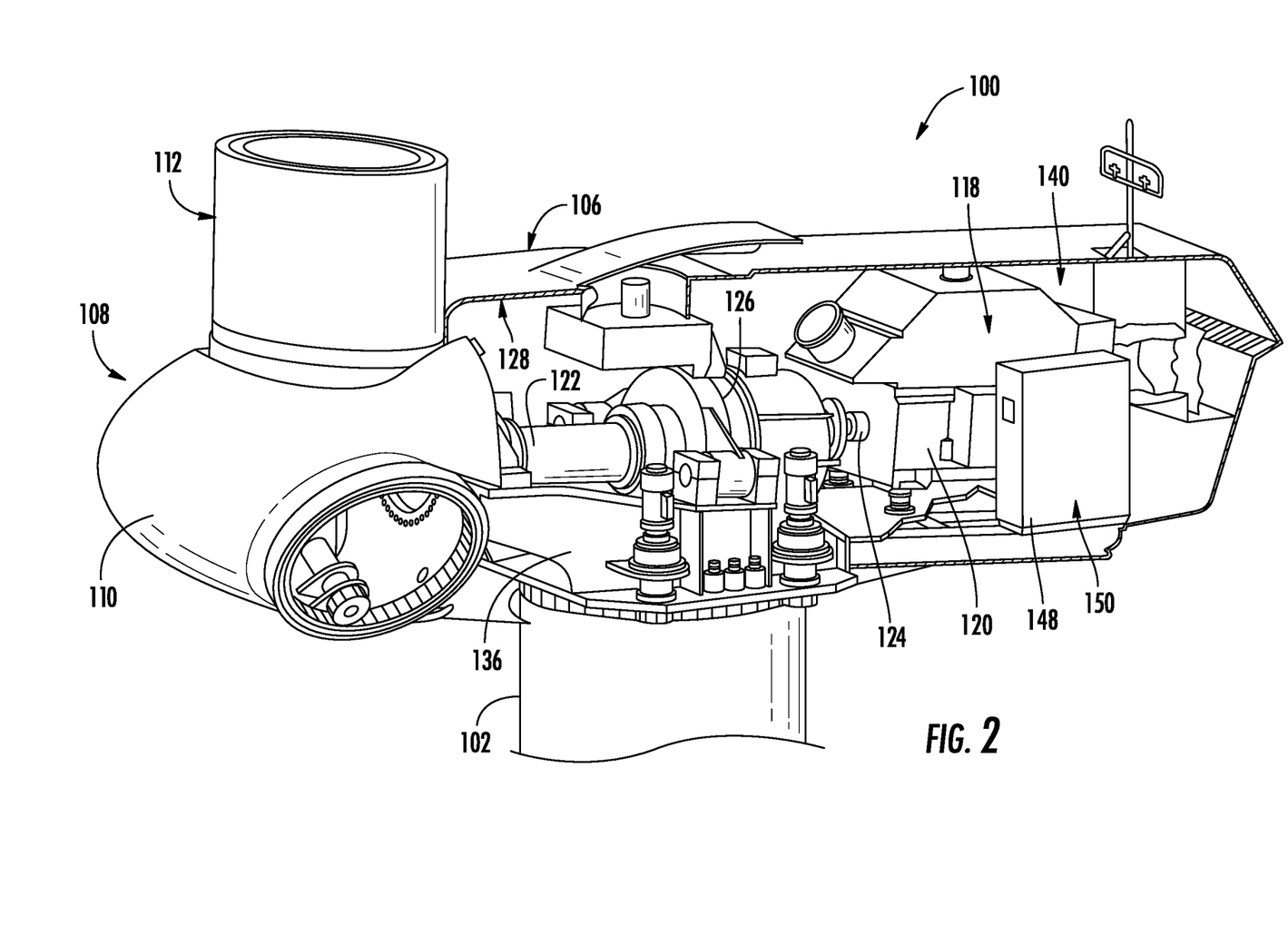
FIG. 2 illustrates a perspective, internal view of one embodiment of a nacelle of a wind turbine according to the present disclosure.
Figure 3:
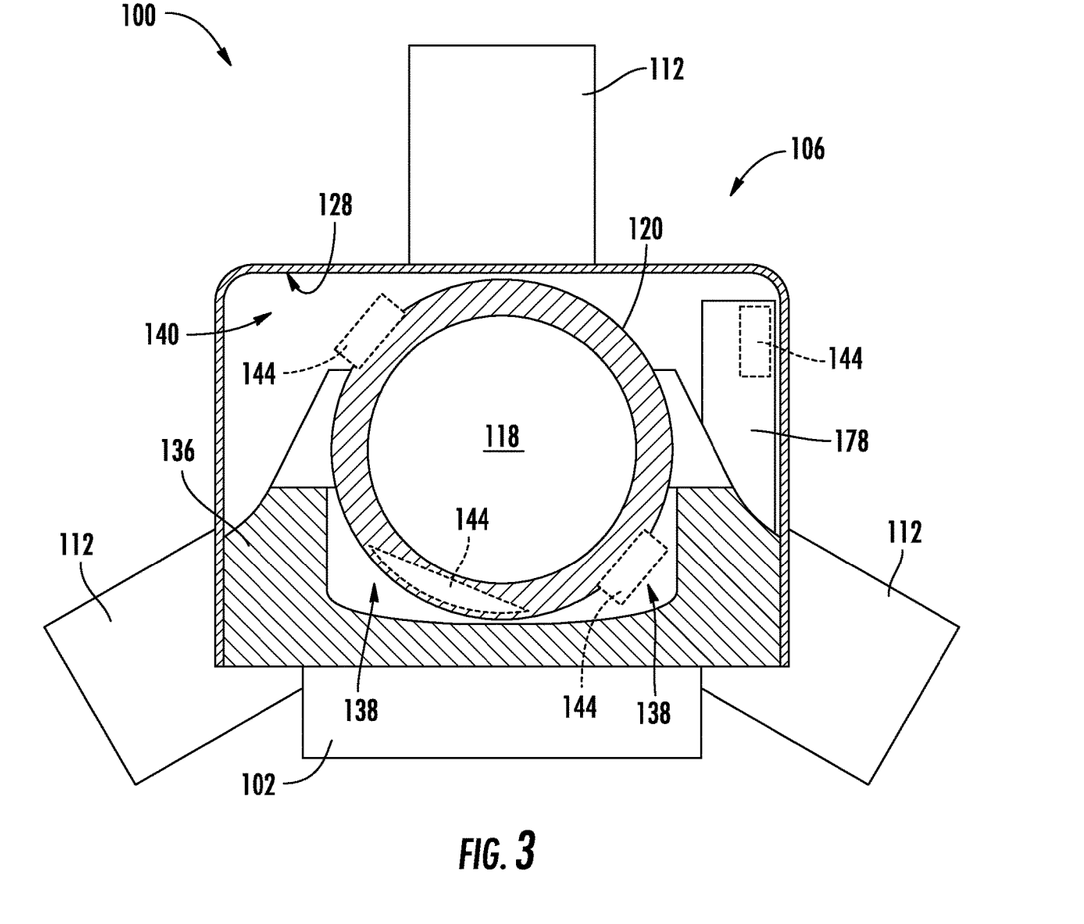
FIG. 3 illustrates a simplified cross-sectional view of one embodiment of a nacelle of the wind turbine according to the present disclosure.

Referring now to FIGS. 2 and 3, a simplified, internal view and a cross-sectional view of one embodiment of the nacelle 106, of the wind turbine 100 shown in FIG. 1 are illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing. The rotor shaft 122 may, in turn, be rotatably coupled to a high-speed shaft 124 of the generator 118 through an optional gearbox 126 connected to a bedplate support frame 136. As is generally understood, the rotor shaft 122 may provide a low-speed, high-torque input to the gearbox 126 in response to rotation of the rotor blades 112 and the hub 110. The gearbox 126 may then be configured with a plurality of gears to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

The electrical system 150 may include the generator 118 disposed within a generator housing 120. The generator housing 120 may be located within the nacelle 106 of the wind turbine 100. For example, as shown, an inner surface 128 of a wall of the nacelle 106 may define a clearance 140 about the generator housing 120. Additionally, as shown in FIG. 3, the generator 118 may be coupled to the bedplate support frame 136 of the wind turbine 100. The bedplate support frame 136 may define a recess 138 between the generator housing 120 and a surface of the bedplate support frame 136.

Figure 4:
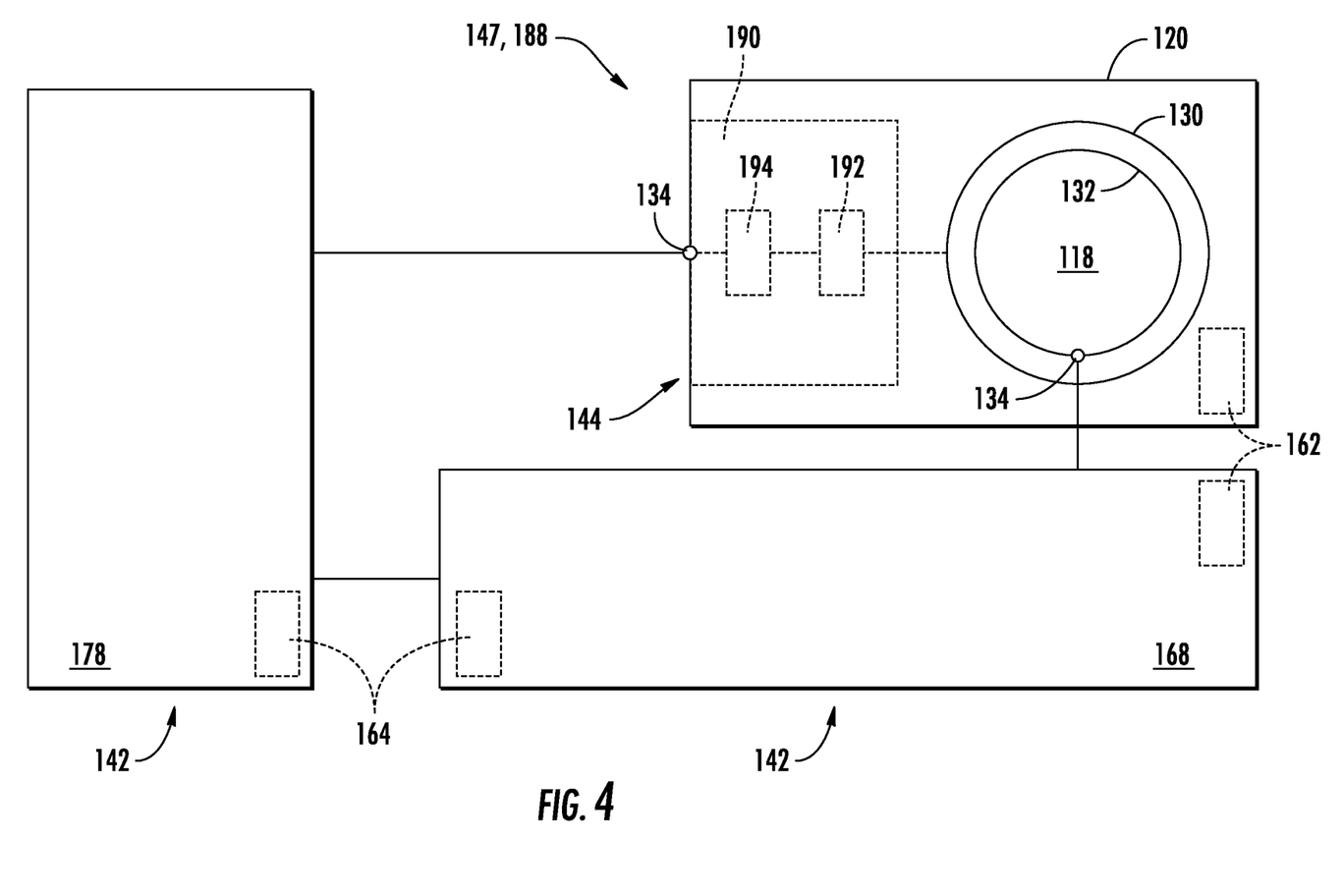
FIG. 4 illustrates a simplified schematic diagram of an electrical system of the wind turbine according to the present disclosure.
Figure 5:
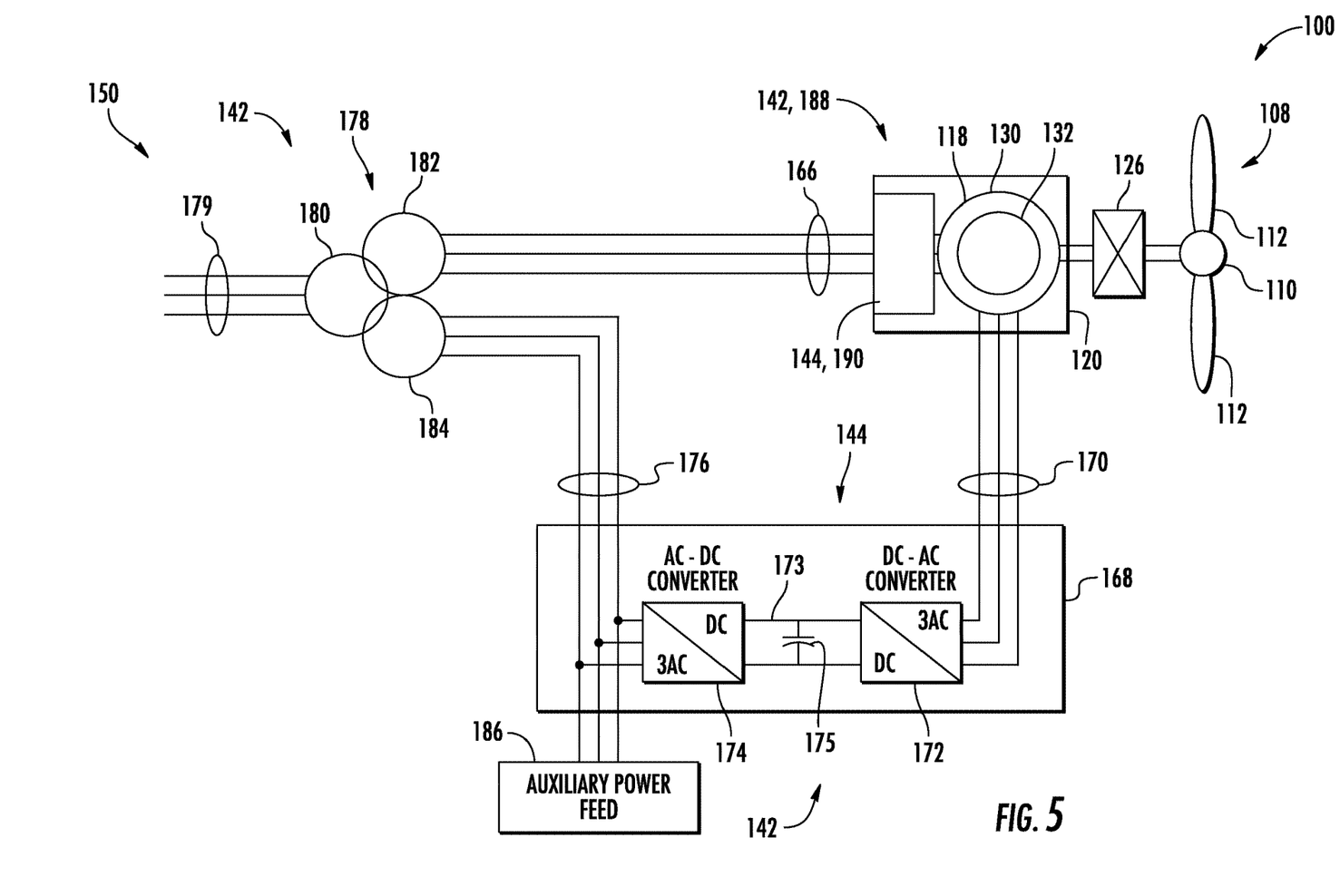
FIG. 5 illustrates an embodiment of the electrical system of FIG. 4 according to the present disclosure.

Referring now to FIGS. 4 and 5, schematic diagrams of embodiments of the electrical system 150 in accordance with the present disclosure are depicted. In an embodiment, the electrical system 150 may include various components for converting the kinetic energy of the rotor 108 into an electrical output in an acceptable form to a connected electrical grid. For example, in an embodiment, the generator 118 may be a doubly-fed induction generator (DFIG). It should be appreciated that while an electrical system 150 utilizing a DFIG generator is presented herein as an exemplary embodiment, the present disclosure is not limited to such embodiments and may include electrical systems 150 utilizing any other suitable electrical generator and/or assemblage of electrical subsystems.

In an embodiment, the generator 118 may include a rotor 132 and a stator 130 operably coupled to a step-up transformer 178. As shown particularly in FIG. 5, the stator 130 may be coupled to the step-up transform 178 via a stator bus 166. Additionally, the rotor 132 may be coupled to the transformer via a rotor bus 170 and a power converter subsystem 168. In such a configuration, the stator bus 166 may provide an output multiphase power (e.g. three-phase power) from the stator 130 of the generator 118, and the rotor bus 170 may provide an output multiphase power (e.g. three-phase power) of the rotor 132 of the generator 118. Additionally, the power converter subsystem 168 may include a rotor side converter 172 which may be coupled to the generator 118 via the rotor bus 170. The rotor side converter 172 may be coupled to a line side converter 174 of the power converter subsystem 168 which, in turn, may be coupled to a line side bus 176. Additionally, as shown in FIG. 4, the power converter subsystem 168 may include a rotor-inductor assembly 162 and a voltage feedback assembly 164. It should be appreciated that the power converter subsystem 168 may be disposed within a converter cabinet 148 located within the nacelle 106.

In an embodiment, the rotor side converter 172 and the line side converter 174 may be configured for normal operating mode in a three-phase, pulse width modulation (PWM) arrangement using insulated gate bipolar transistors (IGBTs) as switching devices. Other suitable switching devices may be used, such as insulated gate commuted thyristors, MOSFETs, bipolar transistors, silicone controlled rectifier's, and/or other suitable switching devices. The rotor side converter 172 and the line side converter 174 may be coupled via a DC link 173 across which may be a DC link capacitor 175.

As further depicted in FIG. 4, the electrical system 150 may, in an embodiment, include a step-up transformer 178 coupling the wind turbine 100 to an electrical grid 179. The transformer 178 may, in an embodiment, be a three-winding transformer which includes a high voltage (e.g. greater than 12 KVAC) primary winding 180. The high voltage primary winding 180 may be coupled to the electrical grid 179. The transformer 178 may also include a medium voltage (e.g. 6 KVAC) secondary winding 182 coupled to the stator bus 166 and a low voltage (e.g. 575 VAC, 690 VAC, etc.) auxiliary winding 184 coupled to the line bus 176. It should be appreciated that the transformer 178 can be a three-winding transformer as depicted, or alternatively, may be a two-winding transformer having only a primary winding 180 and a secondary winding 182; may be a four-winding transformer having a primary winding 180, a secondary winding 182, and auxiliary winding 184, and an additional auxiliary winding; or may have any other suitable number of windings.

In an additional embodiment, the electrical system 150 may include an auxiliary power feed 186 coupled to the output of the power converter subsystem 168. The auxiliary power feed 186 may act as a power source for various components of the wind turbine system 100. For example, the auxiliary power feed 186 may power fans, pumps, motors, and other suitable components of the wind turbine system 100.

Still referring to FIGS. 4 and 5, in an embodiment, the electrical system 150 may also include a stator switch subsystem 188. In an embodiment, the stator switch subsystem 188 may include a stator switch 190 which synchronizes the three-phase power from the stator 130 of the generator 118. Further, the stator switch 190 may include electrical components such as a sync-switch 192 (e.g., a contactor) and/or an isolator 194 or any suitable combinations thereof. The stator switch subsystem 188 may also include such other electrical components, including fuses, resistors, grid-side voltage feedback assemblies, and/or relays, as may be required to synchronize the three-phase power from the stator 130.

Referring now to FIGS. 3-5, in an embodiment, the electrical system 150 may include the plurality of electrical subsystems 142 having a plurality of electrical subsystem assemblies 144. At least one of the electrical subsystem assemblies 144 may be integrated with the generator housing 120. The electrical subsystem assembly(s) 144 may be operably coupled between the stator 130 or the rotor 132 and the generator output connection(s) 134. It should be appreciated that the electrical subsystems 142 may include any electrical subsystem required to generate electricity and deliver the electricity to the electrical grid 179. The electrical subsystems 142 may, for example, include the stator switch subsystem 188, the power converter subsystem 168 and/or the generator step-up transformer 178.

In an embodiment, the electrical subsystem assembly(s) 144 may be wholly integrated with the generator housing 120 such that the electrical subsystem assembly(s) 144 is essentially encapsulated by the generator housing 120. In an additional embodiment, the electrical subsystem assembly(s) 144 may be positioned at least partly within the recess 138 (FIG. 3) defined between the generator housing 120 and the bedplate support frame 136. In an additional embodiment, the electrical subsystem assembly(s) 144 may be positioned at least partially within the clearance 140 defined between the inner surface 128 of the nacelle 106 and the generator housing 120. It should be appreciated that integrating the electrical subsystem assembly(s) 144 with the generator housing 120 may include positioning the electrical subsystem assembly(s) 144 at least partially within a recess formed in the generator housing 120 and/or coupling the electrical subsystem assembly(s) 144 to a surface of the generator housing 120.

In an embodiment, coupling the electrical subsystem assembly(s) 144 to the generator housing 120 may be accomplished by any acceptable means, such as adhesion, welding, and/or mechanical fastening. Additionally, coupling the electrical subsystem assembly(s) 144 to the generator housing 120 may establish an electrical coupling between the electrical subsystem assembly(s) 144 and the generator housing 120. In an embodiment, coupling the electrical subsystem assembly(s) 144 and the generator housing may electrically ground the electrical subsystem assembly(s) 144 via the generator housing.

In an embodiment, wherein the electrical subsystem 142 is the stator switch subsystem 188, the stator switch 190 may be integrated with the generator housing 120. The stator switch 190 may be operably coupled in line between the generator output connection 134 and the stator 130. The generator output connection 134 may then be operably coupled to the transformer 178. In other words, the stator 130 may be coupled in series to the stator switch 190 and to the transformer 178 via the stator bus 166. The stator switch 190 may include electrical components such as a sync-switch 192 and/or the isolator 194 or any suitable combinations thereof.

It should be appreciated that integrating the stator switch 190 with the generator housing 120 may eliminate a requirement for the electrical system 150 to include a stator switch cabinet. In such an embodiment, the connection between the stator 132 and the transformer 178 may not pass through an electrical subsystem cabinet 148 of the electrical system 150. Additionally, in such an embodiment, components of the stator switch subsystem 188 not included in the stator switch 190 may be integrated with the power converter subsystem 168 and/or the transformer 178. For example, in an embodiment, the isolator 194 may be disposed outside of the generator housing 120. In such an embodiment, the isolator 194 may be incorporated with the transformer 178. Additionally, the isolator 194 may be collocated with the grid-side voltage feedback assembly.

In an embodiment, wherein the stator switch 190 is integrated with the generator housing 120, the stator switch 190 may be electrically grounded via the generator housing 120. Being electrically grounded via the generator housing 120, the stator switch subsystem 188 may be absent a stator grounding switch as such a grounding switch is no longer required. It should be appreciated that eliminating a requirement for a stator grounding switch may reduce the complexity and/or cost of the electrical system 150.

In an embodiment, wherein the electrical subsystem 142 is the power converter subsystem 168, the rotor-inductor assembly 162 may be integrated with the generator housing 120. The rotor-inductor assembly 162 may be operably coupled between the generator output connection 134 and the rotor 132. The generator output connection 134 may then be operably coupled to the power converter subsystem 168 via the rotor bus 170. In an embodiment, the rotor-inductor assembly 162 may include a plurality of inductors and/or variable capacitors.

In an additional embodiment, the voltage feedback assembly 164 of the power converter subsystem 168 may be integrated with the transformer 178. In at least one embodiment, the transformer 178 may be positioned within the nacelle 106 of the wind turbine 100. It should be appreciated that integrating the rotor-inductor assembly 162 with the generator housing 120 and/or the voltage feedback assembly 164 with the generator transformer 178 may facilitate a reduction of the surface area of a converter cabinet relative to a power converter subsystem 168 retaining the rotor-inductor assembly 162 and/or the voltage feedback assembly 164.

In an embodiment, the integration of the stator switch 190 and/or the rotor-inductor assembly 162 may facilitate a reduction in the overall footprint of the electrical system 150 relative to an embodiment of the electrical system 150, wherein the electrical subsystems 142 are positioned within a plurality of electrical subsystem cabinets. For example, integrating electrical subsystem assembly(s) 144 with the generator housing 120 may facilitate the elimination of one of the electrical subsystem cabinets 148 and/or the reduction in the surface area of the electrical subsystem cabinets 148. As a further example, the integration of the electrical subsystem assembly(s) 144 may permit a reduction in a gauge and/or a reduction in the number of electrical system cables positioned within the nacelle 106 relative to an electrical system nominal design. In at least one embodiment, integrating the electrical subsystem assembly(s) 144 with the generator housing 120 and/or the transformer 178 may facilitate retrofitting an existing electrical system in order to reduce the overall footprint of the electrical system 150 relative to the existing nominal design.

Figure 6:
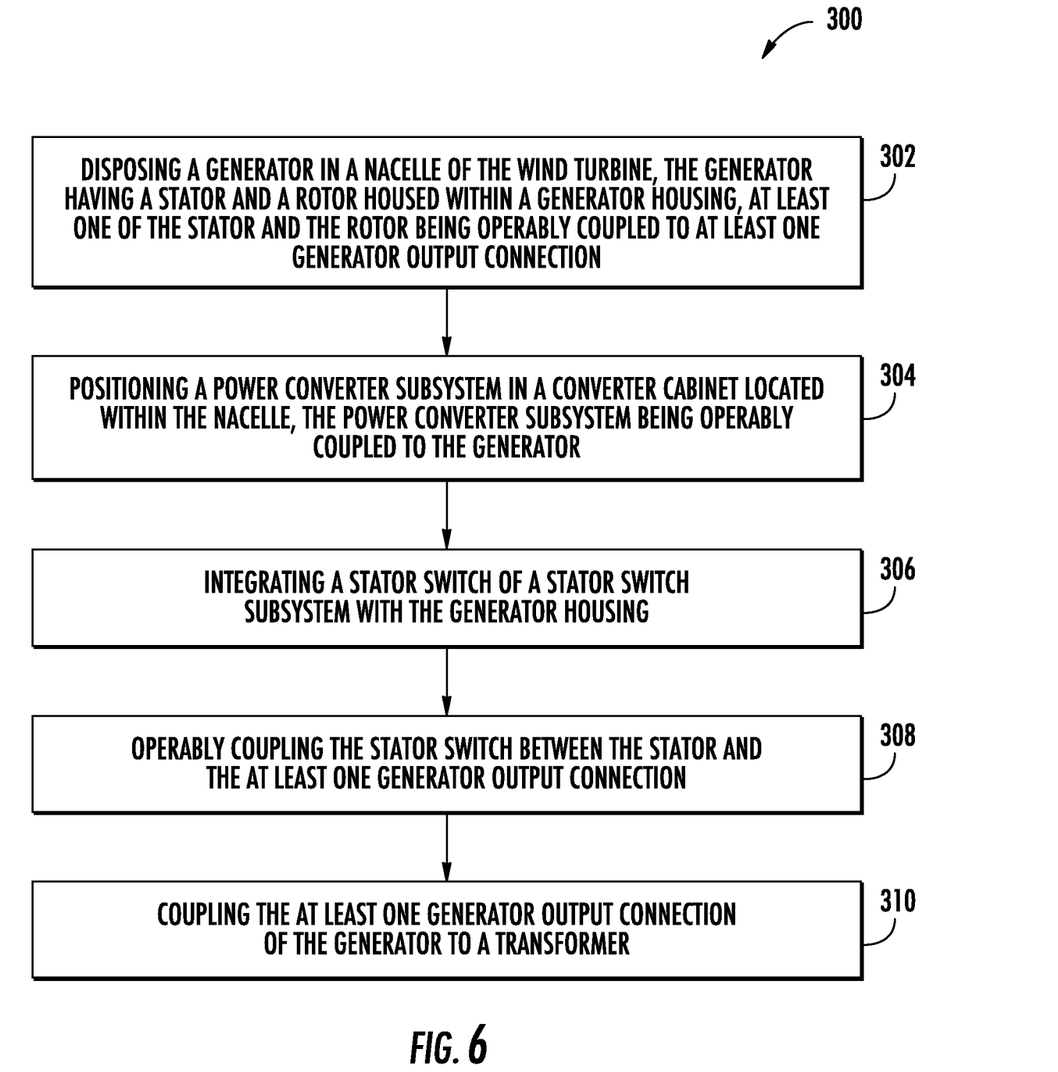
FIG. 6 illustrates a flow diagram of one embodiment of a method for reducing an uptower footprint of an electrical system of a wind turbine according to the present disclosure.

Referring now to FIG. 6, a flow diagram of one embodiment of a method 300 for producing an uptower footprint of an electrical system of a wind turbine is illustrated. The method 300 may be implemented using, for instance, the electrical system 150 discussed above with references to FIGS. 1-5. FIG. 6 depicts steps performed in a particular order for purposes of illustration and discussion. Those of ordinary skill in the art, using the disclosures provided herein, will understand that various steps of the method 300, or any of the methods disclosed herein, may be adapted, modified, rearranged, performed simultaneously, or modified in various ways without deviating from the scope of the present disclosure.

As shown at (302), the method 300 may include disposing a generator within a nacelle of the wind turbine, the generator having a rotor and a stator disposed within a generator housing. At least one of the stator and the rotor may be operably coupled to at least one generator output connection. As shown at (304), the method 300 may include positioning a power converter subsystem in a converter cabinet located within the nacelle. The power converter subsystem may be operably coupled to the generator. As shown at (306), the method 300 may include integrating a stator switch of a stator switch subsystem with the generator housing. As shown at (308), the method 300 may include operably coupling the stator switch between the stator in the at least one generator output connection. Additionally as shown at (310), the method 300 may include coupling the at least one generator output connection of the generator to a step-up transformer.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. An electrical system for a wind turbine, the electrical system comprising: a generator located in a nacelle of the wind turbine, the generator comprising a stator and a rotor housed within a generator housing, at least one of the stator and the rotor being operably coupled to at least one generator output connection; and a plurality of electrical subsystems comprising a plurality of electrical subsystem assemblies, at least one electrical subsystem assembly being integrated with the generator housing, the at least one electrical subsystem assembly being operably coupled between the stator or the rotor and the at least one generator output connection, the plurality of electrical subsystems comprising a stator switch subsystem, a power converter subsystem, and a generator step-up transformer.

Clause 2. The electrical system of any preceding clause, wherein the at least one electrical subsystem assembly integrated with the generator housing comprises at least one of a stator switch of the stator switch subsystem and a rotor-inductor assembly of the power converter subsystem.

Clause 3. The electrical system of any preceding clause, wherein the stator switch is operably coupled between the at least one generator output connection and the stator, and wherein the at least one generator output connection is coupled to the generator step-up transformer.

Clause 4. The electrical system of any preceding clause, wherein the at least one electrical subsystem assembly integrated with the generator housing comprises the stator switch of the stator switch subsystem and the rotor-inductor assembly of the power converter subsystem.

Clause 5. The electrical system of any preceding clause, wherein the generator housing is coupled to a bedplate support frame of the wind turbine, wherein the bedplate support frame defines a recess between the generator housing and a surface of the bedplate support frame, wherein the at least one electrical subsystem assembly is positioned at least partially within the recess.

Clause 6. The electrical system of any preceding clause, wherein the nacelle defines a clearance between an inner surface of a wall of the nacelle and the generator housing, wherein the at least one electrical subsystem assembly is positioned at least partially within the clearance.

Clause 7. The electrical system of any preceding clause, wherein the at least one electrical subsystem assembly is electrically grounded by the generator housing.

Clause 8. The electrical system of any preceding clause, wherein the stator switch subsystem is absent of a stator grounding switch.

Clause 9. A method for reducing an uptower footprint of an electrical system of a wind turbine, the method comprising: disposing a generator in a nacelle of the wind turbine, the generator having a stator and a rotor housed within a generator housing, at least one of the stator and the rotor being operably coupled to at least one generator output connection; positioning a power converter subsystem in a converter cabinet located within the nacelle, the power converter subsystem being operably coupled to the generator; integrating a stator switch of a stator switch subsystem with the generator housing; operably coupling the stator switch between the stator and the at least one generator output connection; and coupling the at least one generator output connection of the generator to a transformer.

Clause 10. The method of any preceding clause, further comprising: retrofitting an existing electrical system of the wind turbine to reduce the overall footprint thereof, wherein integrating the stator switch permits at least one of a reduction in the surface area of the electrical system and a number electrical subsystem cabinets relative to an electrical system nominal design.

Clause 11. The method of any preceding clause, wherein integrating the stator switch comprises: electrically grounding the stator switch with the generator housing; and eliminating a stator grounding switch of the stator switch subsystem.

Clause 12. The method of any preceding clause, further comprising: wherein integrating the stator switch with the generator housing permits at least one of a reduction in a gauge and a reduction in the number of electrical system cables positioned within the nacelle.

Clause 13. The method of any preceding clause, further comprising: integrating a rotor-inductor assembly of the power converter subsystem with the generator housing; and integrating a voltage feedback assembly of the power converter subsystem with a generator step-up transformer, wherein integrating the voltage feedback assembly and the rotor-inductor assembly permits a reduction in the surface area of the converter cabinet.

Clause 14. The method of any preceding clause, wherein the wind turbine further comprises a bedplate support frame positioned within the nacelle, wherein the generator housing is coupled to a bedplate support frame, wherein the bedplate support frame defines a recess between the generator housing and a surface of the bedplate support frame; the method further comprising: positioning at least one of the stator switch and a power converter subsystem assembly at least partially within the recess.

Clause 15. A wind turbine, comprising: a tower; a nacelle mounted atop the tower; a rotor mounted to the nacelle, the rotor comprising a rotatable hub having a plurality of rotor blades secured thereto; and an electrical system disposed within the nacelle, the electrical system comprising: a generator located in the nacelle, the generator comprising a stator and a rotor housed within a generator housing, at least one of the stator and the rotor being operably coupled to at least one generator output connection, a plurality of electrical subsystems comprising a plurality of electrical subsystem assemblies, the plurality of electrical subsystems comprising: a stator switch subsystem being operably coupled to the generator, a power converter subsystem positioned in a converter cabinet within the nacelle, the power converter subsystem being operably coupled to the generator, and a transformer positioned within the nacelle and operably coupled to the stator switch subsystem and the power converter subsystem; and at least one of a stator switch and a power converter subsystem assembly being integrated with the generator housing and being operably coupled between the stator or the rotor and the at least one generator output connection.

Clause 16. The system of any preceding clause, further comprising: a voltage feedback assembly of the power converter subsystem integrated with the generator transformer.

Clause 17. The system of any preceding clause, wherein the generator is coupled to the step-up transformer.

Clause 18. The system of any preceding clause, wherein the power converter subsystem component integrated with the generator housing comprises a rotor-inductor assembly of a power converter subsystem.

Clause 19. The system of any preceding clause, wherein the wind turbine further comprises a bedplate support frame positioned within the nacelle, wherein the generator housing is coupled to a bedplate support frame, wherein the bedplate support frame defines a recess between the generator housing and a surface of the bedplate support frame; and the at least one of the stator switch and the power converter subsystem component is positioned at least partially within the recess.

Clause 20. The system of any preceding clause, wherein the stator switch subsystem is absent of a stator grounding switch.

What is claimed is:

1. An electrical system for a wind turbine, the electrical system comprising:
a generator located in a nacelle of the wind turbine, the generator comprising a stator and a rotor both housed within a generator housing, at least one of the stator and the rotor being operably coupled to at least one generator output connection;
a stator switch subsystem, the stator switch subsystem comprising a stator switch, wherein the stator switch synchronizes a three-phase power from the stator of the generator;
a power converter subsystem;
a generator step-up transformer; and
a plurality of electrical subsystem assemblies, at least one electrical subsystem assembly of the plurality of electrical subsystem assemblies being integrated with the generator housing, the at least one electrical subsystem assembly of the plurality of electrical subsystem assemblies being operably coupled between the stator or the rotor and the at least one generator output connection, wherein the at least one electrical subsystem assembly integrated with the generator housing comprises at least one of the stator switch of the stator switch subsystem and a rotor-inductor assembly of the power converter subsystem, wherein the rotor-inductor assembly comprises the rotor and a plurality of inductors;
wherein the generator housing is coupled to a bedplate support frame of the wind turbine, wherein the bedplate support frame defines a recess between the generator housing and a surface of the bedplate support frame, wherein the at least one electrical subsystem assembly is positioned at least partially within the recess.

2. The electrical system of claim 1, wherein the at least one electrical subsystem assembly integrated with the generator housing comprises the stator switch of the stator switch subsystem, wherein the stator switch is operably coupled between the at least one generator output connection and the stator, and wherein the at least one generator output connection is coupled to the generator step-up transformer.

3. The electrical system of claim 1, wherein the stator switch of the stator switch subsystem and the rotor-inductor assembly of the power converter subsystem are both integrated with the generator housing, wherein the stator switch subsystem is integrated with the generator housing via the stator switch being operably coupled in line between the at least one generator output connection and the stator, wherein the rotor-inductor assembly is integrated with the generator housing via the rotor-inductor assembly being operably coupled between the generator output connection and the rotor.

4. The electrical system of claim 1, wherein the nacelle defines a clearance between an inner surface of a wall of the nacelle and the generator housing, wherein the at least one electrical subsystem assembly is positioned at least partially within the clearance.

5. The electrical system of claim 1, wherein the at least one electrical subsystem assembly is electrically grounded by the generator housing.

6. The electrical system of claim 5, wherein the stator switch subsystem is absent of a stator grounding switch.

7. An electrical system for a wind turbine, the electrical system comprising:
a generator located in a nacelle of the wind turbine, the generator comprising a stator and a rotor both housed within a generator housing, at least one of the stator and the rotor being operably coupled to at least one generator output connection;
a stator switch subsystem, the stator switch subsystem comprising a stator switch;
a power converter subsystem;
a generator step-up transformer; and
a plurality of electrical subsystem assemblies, at least one electrical subsystem assembly of the plurality of electrical subsystem assemblies being integrated with the generator housing, the at least one electrical subsystem assembly of the plurality of electrical subsystem assemblies being operably coupled between the stator or the rotor and the at least one generator output connection;
wherein the generator housing is coupled to a bedplate support frame of the wind turbine, wherein the bedplate support frame defines a recess between the generator housing and a surface of the bedplate support frame, wherein the at least one electrical subsystem assembly is positioned at least partially within the recess.

* * * * *